(12) United States Patent
Fukatsu

(10) Patent No.: US 9,202,439 B2
(45) Date of Patent: Dec. 1, 2015

(54) DISPLAY INFORMATION COLLECTING DEVICE AND HMI SYSTEM

(75) Inventor: Noriyasu Fukatsu, Chiyoda-ku (JP)

(73) Assignee: Mitsubishi Electric Corporation, Tokyo (JP)

(*) Notice: Subject to any disclaimer, the term of this patent is extended or adjusted under 35 U.S.C. 154(b) by 0 days.

(21) Appl. No.: 14/391,857

(22) PCT Filed: May 24, 2012

(86) PCT No.: PCT/JP2012/063369
§ 371 (c)(1),
(2), (4) Date: Oct. 10, 2014

(87) PCT Pub. No.: WO2013/175617
PCT Pub. Date: Nov. 28, 2013

(65) Prior Publication Data
US 2015/0077332 A1    Mar. 19, 2015

(51) Int. Cl.
*G09G 5/12*     (2006.01)
*G06F 21/31*    (2013.01)
(Continued)

(52) U.S. Cl.
CPC .......... *G09G 5/12* (2013.01); *G06F 3/1423* (2013.01); *G06F 21/316* (2013.01); *G06F 21/35* (2013.01); *G09G 5/006* (2013.01); *G09G 2354/00* (2013.01); *G09G 2370/04* (2013.01); *G09G 2370/06* (2013.01); *G09G 2370/16* (2013.01)

(58) Field of Classification Search
CPC . G09G 5/12; G09G 2354/00; G09G 2370/06; G09G 2370/16; G06F 3/1423
USPC ................... 340/5.2, 825.22; 700/83
See application file for complete search history.

(56) References Cited

U.S. PATENT DOCUMENTS

| 7,496,765 | B2 | 2/2009 | Sengoku |
| 7,647,126 | B2 | 1/2010 | Blevins et al. |

(Continued)

FOREIGN PATENT DOCUMENTS

| DE | 102010015509 A1 | 11/2011 |
| JP | 10-275164 A | 10/1998 |

(Continued)

OTHER PUBLICATIONS

Communication dated Feb. 23, 2015, issued by the German Patent and Trademark Office in corresponding application No. 11 2012 006 413.5.

(Continued)

*Primary Examiner* — Jennifer Mehmood
*Assistant Examiner* — Omar Casillashernandez
(74) *Attorney, Agent, or Firm* — Sughrue Mion, PLLC; Richard C. Turner

(57) ABSTRACT

An HMI display terminal unit includes a motion sensor; an IEEE802.11 I/F; and a CPU that transmits, to a smartphone via the IEEE802.11 I/F, data collected from a control device and HMI display data that shapes the collected data for display, wherein the CPU determines whether an operator has approached on the basis of the detection result of the motion sensor; when an operator has approached, acquires unique information on a smartphone of the operator via the IEEE802.11 I/F and authenticates the smartphone on the basis of the acquired unique information; when authentication is successful, transmits the HMI display data and the collected data; and, when authentication fails, does not transmit the HMI display data and the collected data.

15 Claims, 8 Drawing Sheets

(51) Int. Cl.
- *G06F 21/35* (2013.01)
- *G06F 3/14* (2006.01)
- *G09G 5/00* (2006.01)
- *G06G 5/00* (2006.01)

(56) References Cited

U.S. PATENT DOCUMENTS

| | | | |
|---|---|---|---|
| 7,680,546 | B2 | 3/2010 | Gilbert et al. |
| 7,702,409 | B2 | 4/2010 | Lucas et al. |
| 7,783,370 | B2 | 8/2010 | Nixon et al. |
| 7,971,151 | B2 | 6/2011 | Nixon et al. |
| 7,984,096 | B2 | 7/2011 | Beoughter et al. |
| 8,000,658 | B2 | 8/2011 | Kimura |
| 8,000,814 | B2 | 8/2011 | Havekost et al. |
| 8,060,834 | B2 | 11/2011 | Lucas et al. |
| 8,086,955 | B2 | 12/2011 | Zhou et al. |
| 8,127,241 | B2 | 2/2012 | Blevins et al. |
| 8,144,150 | B2 | 3/2012 | Gilbert et al. |
| 8,185,219 | B2 | 5/2012 | Gilbert et al. |
| 8,185,892 | B2 | 5/2012 | Lucas et al. |
| 8,312,060 | B2 | 11/2012 | Gilbert et al. |
| 8,775,967 | B2 | 7/2014 | Nixon et al. |
| 2004/0002902 | A1* | 1/2004 | Muehlhaeuser ............ 705/26 |
| 2007/0168060 | A1 | 7/2007 | Nixon et al. |
| 2007/0168068 | A1 | 7/2007 | Saito |
| 2011/0215921 | A1* | 9/2011 | Ben Ayed et al. ........ 340/539.11 |
| 2011/0252355 | A1 | 10/2011 | Nixon et al. |
| 2013/0079903 | A1* | 3/2013 | Kemmann et al. ............ 700/83 |

FOREIGN PATENT DOCUMENTS

| | | |
|---|---|---|
| JP | 11-24730 A | 1/1999 |
| JP | 2001-282198 A | 10/2001 |
| JP | 2002-91836 A | 3/2002 |
| JP | 2002-268961 A | 9/2002 |
| JP | 2003-295945 A | 10/2003 |
| JP | 2003-296279 A | 10/2003 |
| JP | 2004-295201 A | 10/2004 |
| JP | 2005-267533 A | 9/2005 |
| JP | 2005-301717 A | 10/2005 |
| JP | 2005-303511 A | 10/2005 |
| JP | 2007-18870 A | 1/2007 |
| JP | 2007-272486 A | 10/2007 |
| JP | 2007-537513 A | 12/2007 |
| JP | 2008-9834 A | 1/2008 |
| JP | 2008-225730 A | 9/2008 |
| JP | 2009-165090 A | 7/2009 |
| JP | 2010-39565 A | 2/2010 |
| JP | 2010-39566 A | 2/2010 |
| WO | 2004/053665 A1 | 6/2004 |
| WO | 2005/091098 A1 | 9/2005 |
| WO | 2005/107409 A2 | 11/2005 |

OTHER PUBLICATIONS

Takashi Kawase, "Trend Feeld Data Shushu Katsuyo ni yoru Setsubi Hozen no Susumekata", Instrumentation, May 1, 2002, pp. 61-63, vol. 45, No. 7.

JPO Office Action for Application No. 2012-543380 dated Nov. 13, 2012.

International Search Report for PCT/JP2012/063369 dated Jul. 10, 2012 [PCT/ISA/210].

* cited by examiner

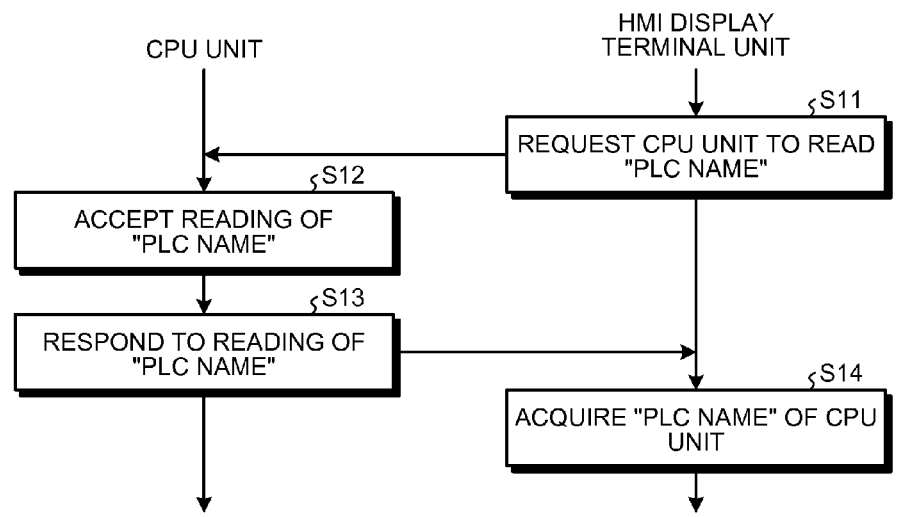
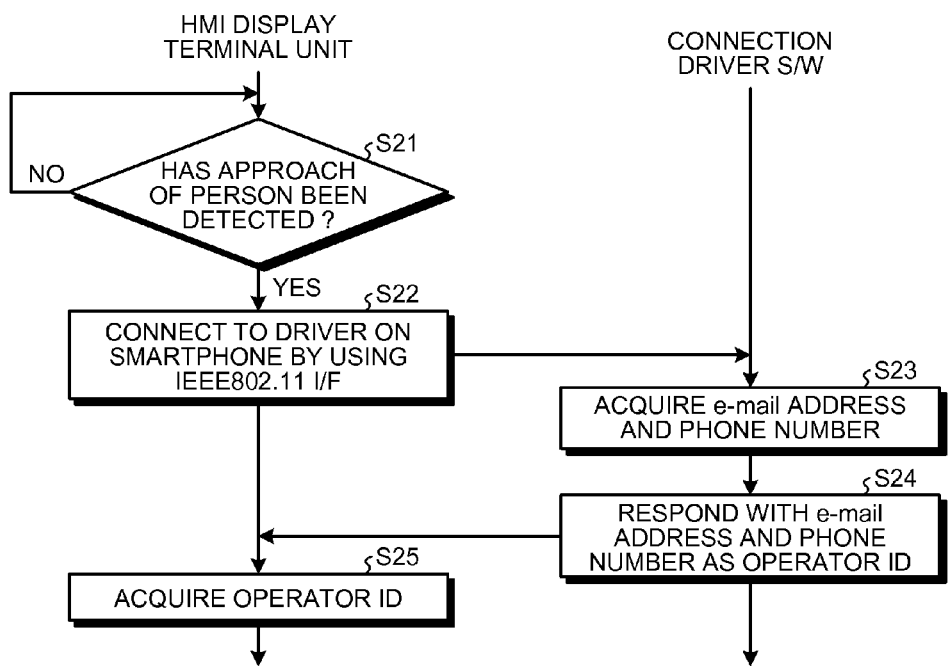

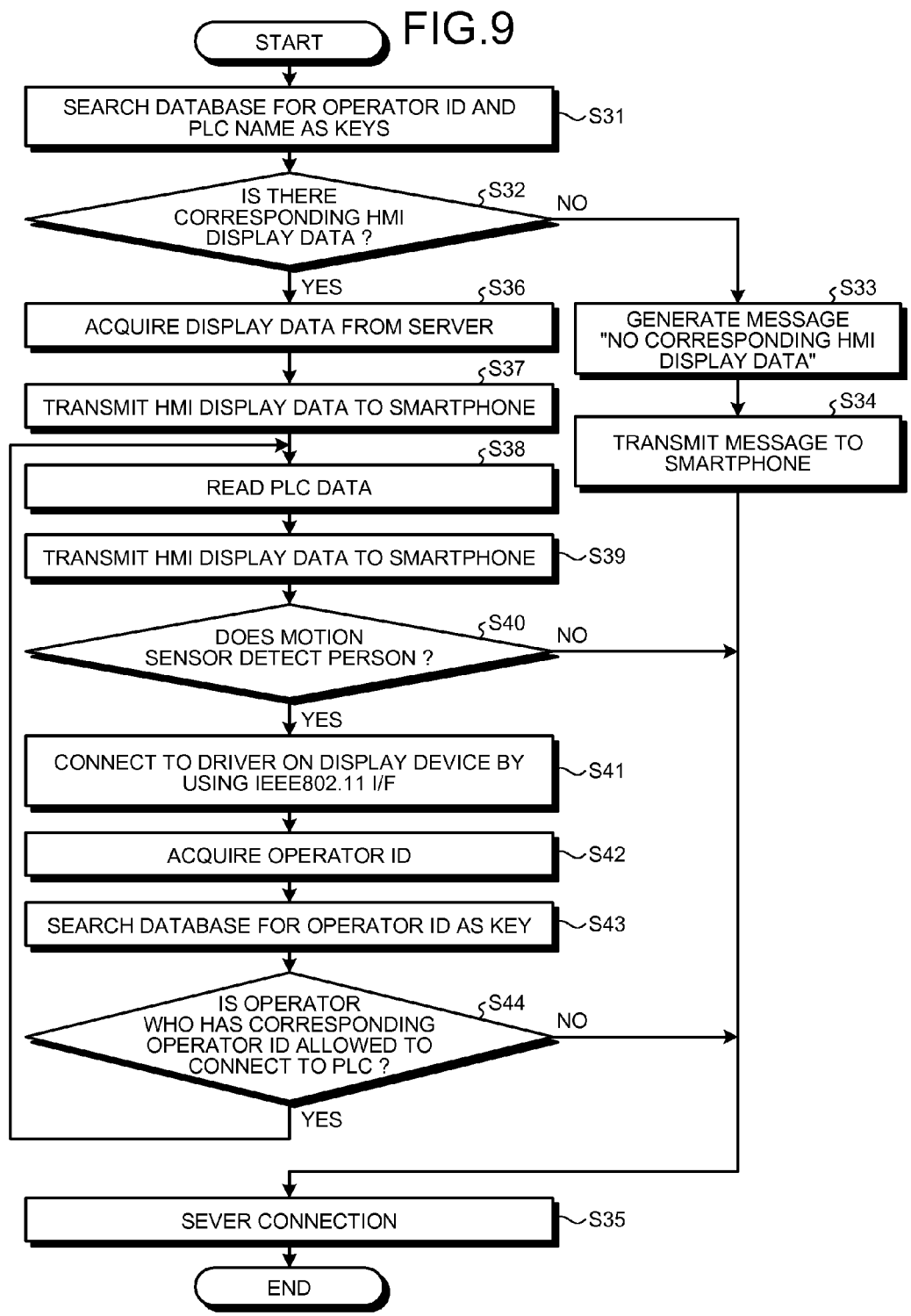

DISPLAY INFORMATION COLLECTING DEVICE AND HMI SYSTEM

CROSS REFERENCE TO RELATED APPLICATIONS

This application is a National Stage of International Application No. PCT/JP2012/063369, filed on May 24, 2012, the contents of all of which are incorporated herein by reference in their entirety.

FIELD

The present invention relates to a display information collecting device and an HMI system that realize an HMI (Human Machine Interface) function of a control device that controls a controlled device.

BACKGROUND

Conventional control devices that control controlled devices such as industrial machines include programmable controllers (PLCs) and microcomputer control devices. These control devices are in some cases equipped with a display device that collects information in the internal memory in the control device and information in an I/O signal and displays it so that the operator can check operating information on the controlled device and the like and operate the control device itself.

Examples of a display device connected to a PLC include a programmable display (for example, see Patent Literature 1). The programmable display collects bitwise information in the data memory or the like, which is information on the operating state of the controlled device, and numerical information, such as the number of products, from the PLC via a serial communication port that is called an upper link unit or the like. Then, the programmable display displays and outputs the information on a touch panel in a form based on the HMI display data programmed therein in advance. Moreover, the programmable display can receive an input for operating the values in the data memory of the PLC via the touch panel and update the values in the data memory of the PLC on the basis of the received input.

CITATION LIST

Patent Literature

Patent Literature 1: Japanese Patent Application Laid-open No. 2001-282198

SUMMARY

Technical Problem

However, because the conventional display device described above includes a display, such as a liquid crystal panel composing a touch panel, that is larger than the control device, there is a problem in that the control panel that houses the control device is inevitably increased in size.

The present invention has been achieved in view of the above and an object of the present invention is to obtain a display information collecting device and an HMI system that realize an HMI function of a control device by using a personal digital assistant.

Solution to Problem

In order to solve the above problems and achieve the object, the present invention relates to a display information collecting device that is connected to a control device and collects internal information in the control device for display, the device including: a motion sensor that detects a location of an operator in a vicinity of the display information collecting device; a wireless communication interface for performing wireless communication with a personal digital assistant that includes a display and stores unique information; and a control unit that transmits, to the personal digital assistant via the wireless communication interface, the collected internal information and screen data that shapes the collected internal information for display, in order to cause the display of the personal digital assistant to display the transmitted internal information, wherein the control unit determines whether an operator has approached a vicinity of the display information collecting device on a basis of a detection result of the motion sensor; when an operator has approached a vicinity of the display information collecting device, acquires unique information on a personal digital assistant owned by the operator who has approached a vicinity of the display information collecting device via the wireless communication interface and authenticates the personal digital assistant on a basis of the acquired unique information; when authentication is successful, transmits the screen data and the collected internal information; and, when authentication fails, does not transmit the screen data and the collected internal information.

Advantageous Effects of Invention

The display information collecting device according to the present invention can cause a display included in a personal digital assistant owned by the operator to display collected data and thus can realize the HMI function of a control device by using a personal digital assistant.

BRIEF DESCRIPTION OF DRAWINGS

FIG. 7 is a sequence diagram explaining the operations of the HMI display terminal unit and the CPU unit when the power is turned on.

FIG. 8 is a sequence diagram explaining the operations of a connection driver S/W performed when the HMI display terminal unit and the smartphone start to connect with each other.

FIG. 9 is a flowchart explaining the operation of an HMI display terminal unit 4 after connecting to the smartphone.

DESCRIPTION OF EMBODIMENTS

Exemplary embodiments of a display information collecting device and an HMI system according to the present invention will be explained below in detail with reference to the drawings. The present invention is not limited to the embodiment.

Embodiment

Figure 1:
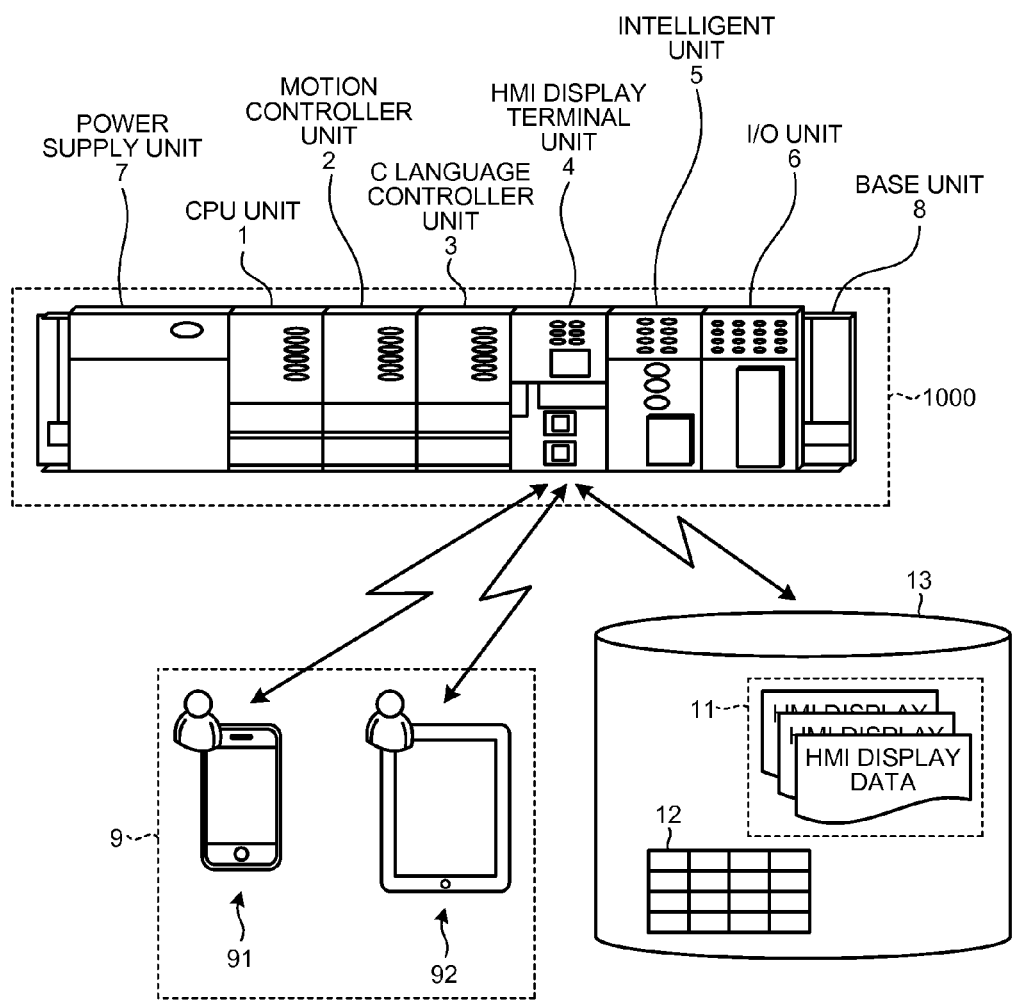
FIG. 1 is a diagram explaining an operation example of a PLC that includes a display information collecting device according to an embodiment of the present invention.

FIG. 1 is a diagram explaining an operation example of a PLC that includes a display information collecting device according to an embodiment of the present invention. As illustrated in FIG. 1, a PLC 1000 is configured such that a CPU unit 1, a motion controller unit 2, a C language controller unit 3, an HMI display terminal unit 4, which is the display information collecting device according to the embodiment of the present invention, an intelligent unit 5, an I/O unit 6, and a power supply unit 7 are attached to a base unit 8.

The CPU unit 1 stores therein a sequence ladder program created by the user and performs overall control of the PLC 1000 in accordance with the sequence ladder program. The motion controller unit 2 stores therein a motion control program created by the user and performs position control on various motors in accordance with the motion control program. The C language controller unit 3 stores therein a C language control program created by the user, and controls machine devices and performs information processing in accordance with the C language control program. The intelligent unit 5 is a unit for transmitting and receiving an analog signal to and from the outside and performing serial communication using Ethernet (registered trademark), RS-232, RS-422/485, or the like. The I/O unit 6 is a unit for transmitting and receiving a digital signal to and from the outside. The power supply unit 7 is a unit that supplies power for driving the units 1 to 6 via the base unit 8. The base unit 8 is a unit that supplies power generated by the power supply unit 7 to the units 1 to 6 and realizes a mutual exchange of information by connecting the signal lines between the units 1 to 6.

Each of the CPU unit 1, the motion controller unit 2, and the C language controller unit 3 is a unit that includes therein a CPU and realizes its own control function by the CPU executing a program, and corresponds to a control device.

In recent years, portable information processing devices (personal digital assistants) capable of performing wireless communication, such as laptop PCs (Personal Computers), smartphones, and tablet PCs, have become widespread and their drawing functions have improved year on year. In contrast, as described above, because a programmable display connected to the PLC 1000 for realizing the HMI function includes a large touch panel, there is a problem in that if the PLC 1000 is connected to the programmable display, the size of the control panel that houses therein the PLC 1000 and the programmable display is increased more than necessary. Moreover, for the programmable display providers, who purchase liquid crystal panels from which touch panels are configured from a third party and then manufacture programmable displays, because the price of programmable displays depends on the market price movements of liquid crystal panels, the programmable display providers tend to have a competitive disadvantage on price.

Therefore, in the embodiment of the present invention, the HMI functions of the control devices are realized by using general personal digital assistants instead of using programmable displays that include large touch panels.

Specifically, the HMI display terminal unit 4 collects data (internal information) in the CPU unit 1, the motion controller unit 2, and the C language controller unit 3. As will be described later, the HMI display terminal unit 4 has a wireless network function; therefore, the HMI display terminal unit 4 sends the collected data to a personal digital assistant 9, such as a smartphone 91 or a tablet PC 92, that the operator is carrying by using this wireless network function and displays the collected data on the display of the personal digital assistant 9. In this embodiment, the user who checks the internal information on the control devices on site where the PLC 1000 is installed is called an operator.

The display content of the collected data is shaped in accordance with the HMI display data (screen data). In this embodiment, the HMI display data (HMI display data 11 in FIG. 1) is stored in a server 13. The HMI display terminal unit 4 acquires the HMI display data 11 from the server 13 via the network and transmits the acquired HMI display data 11 to the personal digital assistant 9, and the personal digital assistant 9 shapes the collected data by using the transmitted HMI display data 11 and displays it on the display. In other words, the HMI system in the present embodiment of the present invention is configured from the HMI display terminal unit 4, the personal digital assistant 9, and the server 13. Hereinafter, the smartphone 91 is the only device that is referred to as a representative of the personal digital assistant 9.

The user can arbitrarily determine how many pieces of the HMI display data 11 are prepared per PLC 1000. For example, the HMI display data 11 is prepared per PLC 1000 or is prepared for each of the control devices (the CPU unit 1, the motion controller unit 2, and the C language controller unit 3). In the present embodiment, as an example, the HMI display data 11 is prepared for each of the control devices.

Although the operator can check the collected data and directly operate the data memories in the control devices by using the smartphone 91, it is desirable that its display content and the allowable range of operation of the data memories can be changed according to the operator or the operator attributes. Therefore, one or more pieces of the HMI display data 11 are prepared for each control device and it is determined which HMI display data 11 is used for which operator's smartphone 91 according to the employee attributes, which are operator attributes, or the employee code, which is identification information for identifying an employee. The server 13 includes a database 12 that manages the operators and the HMI display data 11, and the HMI display terminal unit 4 can select the HMI display data 11 to be transmitted to the smartphone 91 on the basis of the database 12. The detailed structure of the database 12 will be described later.

The network that connects the server 13 and the HMI display terminal unit 4 can be established either by wire or wirelessly. In this embodiment, as an example, the HMI display terminal unit 4 is connected to the network to which the server 13 is connected and the smartphone 91 by wireless communication conforming to the IEEE 802.11 standard. In this embodiment, an explanation has been made such that the HMI display data 11 and the database 12 are stored in the server 13, which is connected to the HMI display terminal unit 4 via the network; however, the configuration can be such that part or all of these pieces of information are stored in the HMI display terminal unit 4 in advance. If the configuration is such that these pieces of information are stored in the server 13, there are advantages such as that the user can remotely edit the HMI display data 11 and the database 12 and it is possible to provide centralized control of a plurality of pieces of the HMI display data 11.

Figure 2:
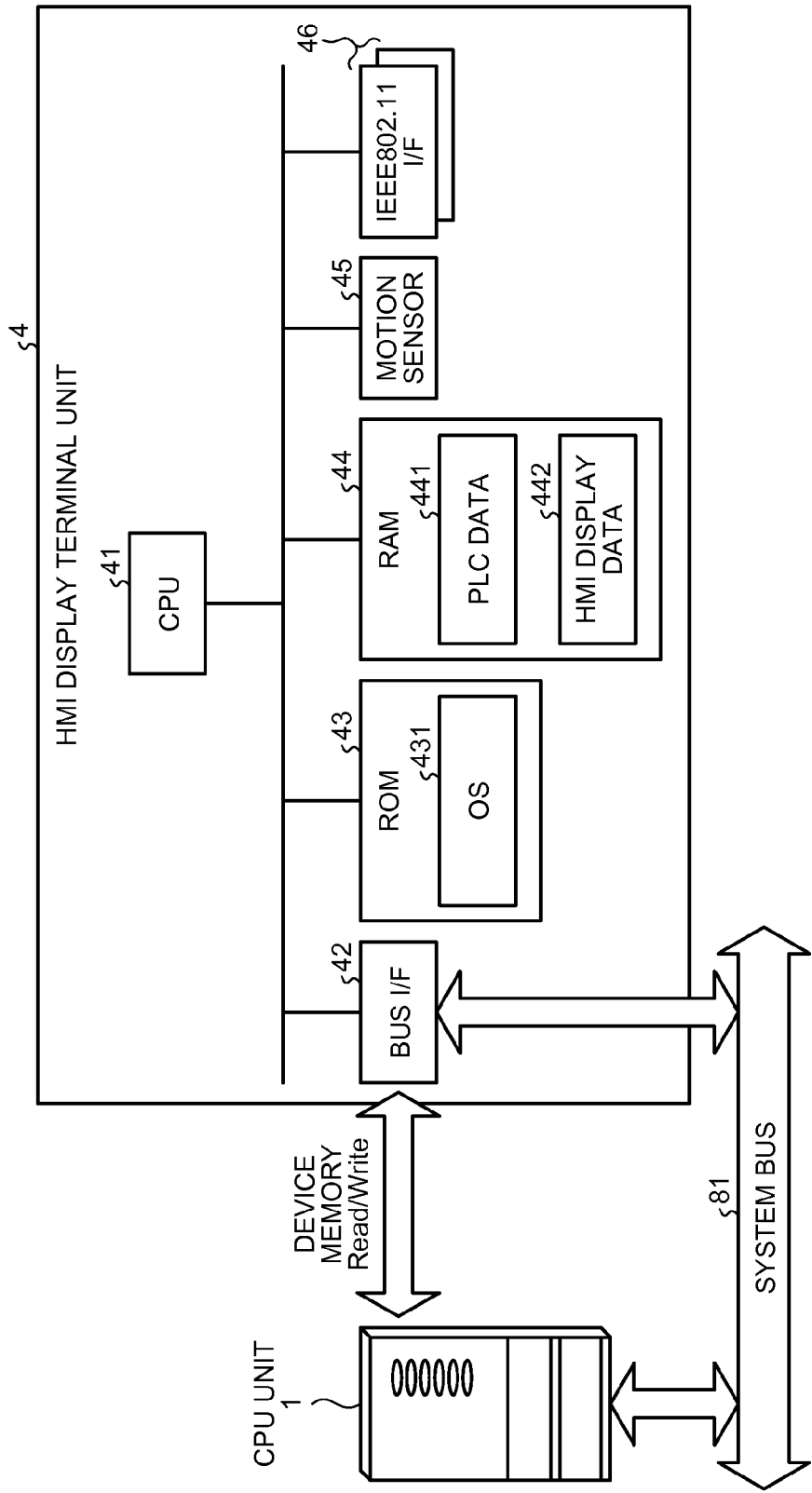
FIG. 2 is a diagram illustrating a hardware configuration example of an HMI display terminal unit.

FIG. 2 is a diagram illustrating a hardware configuration example of the HMI display terminal unit 4. The HMI display terminal unit 4 includes a CPU (control unit) 41, a bus interface (I/F) 42, a ROM 43, a RAM 44, a motion sensor 45, and IEEE802.11 I/Fs 46 for two channels. The CPU 41, the bus I/F 42, the ROM 43, the RAM 44, the motion sensor 45, and the IEEE802.11 I/Fs 46 are connected to each other via an internal bus.

One of the IEEE802.11 I/Fs 46 for two channels is a wireless communication interface for wirelessly connecting to the smartphone 91 and the other one is a wireless communication interface for performing communication with the server 13. The HMI display terminal unit 4 can be connected to the server 13 and the smartphone 91 at the same time by using the two IEEE802.11 I/Fs 46.

The bus I/F 42 is a communication interface for transferring data between the CPU unit 1, the motion controller unit 2, and the C language controller unit 3 via a system bus 81. The system bus 81 is configured such that it is incorporated in the base unit 8.

The ROM (Read Only Memory) 43 stores in advance an operating system program (Operating System Program; OS) 431 for controlling the HMI display terminal unit 4. The CPU 41 reads the OS 431 stored in the ROM 43 and loads the OS 431 into the RAM 44. Then, the CPU 41 realizes an operation of the HMI display terminal unit 4 according to the embodiment of the present invention in accordance with the OS 431 loaded in the RAM 44.

The RAM 44 serves as a program load area into which the OS 431 is loaded. Moreover, in the RAM 44, PLC data 441, which is data collected from the CPU unit 1, the motion controller unit 2, and the C language controller unit 3, and HMI display data 442 collected from the server 13 are temporarily stored. Which data is collected from which control device is different for each different piece of the HMI display data 11. The CPU 41 acquires the content of the specified data memory from the control device specified by the HMI display data 442, which is acquired from the server 13 and is stored in the RAM 44 from among the HMI display data 11 stored in the server 13.

The motion sensor 45 detects a person who has approached the HMI display terminal unit 4. The motion sensor 45 can detect the location of a person within a predetermined distance from the HMI display terminal unit 4 by using, for example, infrared rays, ultrasonic waves, visible light, or a combination thereof. The range within which the motion sensor 45 detects a person is not particularly limited; however, for example, the detection range is the same as or less than the radio coverage area over which the HMI display terminal unit 4 is connected to the smartphone 91 or the server 13 described above. For example, the detection range is approximately a few meters from the HMI display terminal unit 4.

Figure 3:
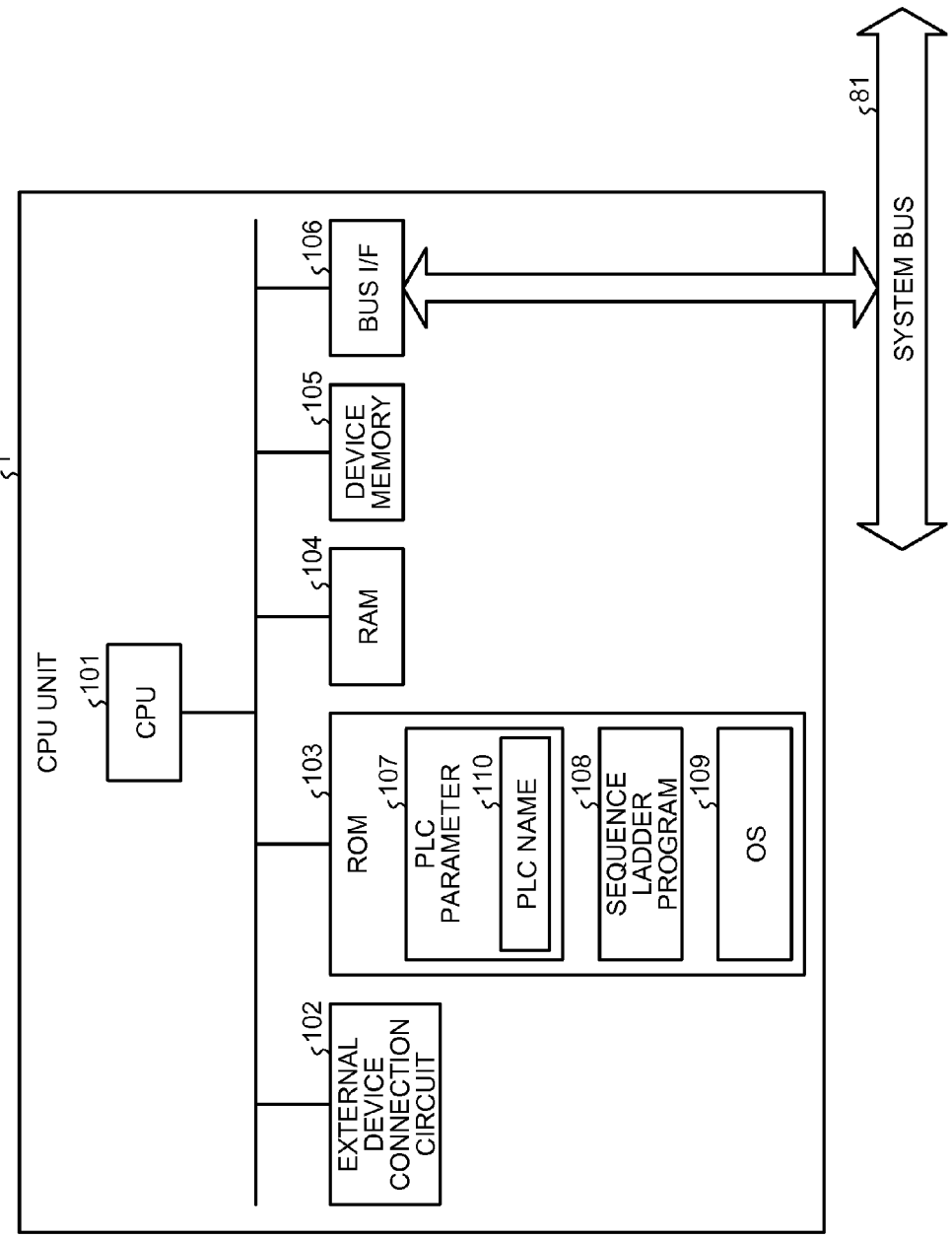
FIG. 3 is a diagram illustrating a hardware configuration example of a CPU unit.

An explanation will be made here of a configuration example of the CPU unit 1, which is a representative of the control unit from which data is to be collected by the HMI display terminal unit 4. FIG. 3 is a diagram illustrating a hardware configuration example of the CPU unit 1.

As illustrated in FIG. 3, the CPU unit 1 includes a CPU 101, an external device connection circuit 102, a ROM 103, a RAM 104, a device memory 105, and a bus I/F 106. The CPU 101, the external device connection circuit 102, the ROM 103, the RAM 104, the device memory 105, and the bus I/F 106 are connected to each other via an internal bus.

The ROM 103 stores in advance a sequence ladder program 108 created by the user, an OS 109, which is a program for realizing the execution environment of the sequence ladder program 108, and a PLC parameter 107. The sequence ladder program 108 is configured to include some variable parameters and specific values of these variable parameters are set in the PLC parameter 107. The PLC parameter 107 includes a PLC name 110 as identification information unique to the CPU unit 1.

The CPU 101 reads the OS 109, loads the OS 109 into the RAM 104, and executes the OS 109 loaded in the RAM 104, thereby realizing the execution environment of the sequence ladder program 108. The CPU 101 loads the sequence ladder program 108 into the RAM 104 under the execution environment realized by the OS 109, uses the PLC parameter 107 for the sequence ladder program 108 loaded in the RAM 104, and performs overall control of the PLC 1000 in accordance with the sequence ladder program 108 that uses the PLC parameter 107.

The RAM 104 can be configured such that the OS 109 and the sequence ladder program 108 that are stored in the RAM 104 are not lost even when the power is off or the sequence ladder program 108 is not executed by backing up the RAM 104 with a battery and the ROM 103 can be configured as a memory that stores a backup of the storage content of the RAM 104. In other words, when the operator edits each piece of information on site, each piece of information in the RAM 104 is updated and is saved in the ROM 103 at a predetermined timing.

The device memory 105 is a memory that stores therein device data that is state information updated by execution of the sequence ladder program 108 and communication with the other units 2 to 6. The device data stored in the device memory 105 can be data to be collected by the HMI display terminal unit 4. In other words, the device memory 105 corresponds to a data memory that stores therein data that is to be collected.

The external device connection circuit 102 is a transceiver circuit for transmitting and receiving data to and from external devices. The operator can set the sequence ladder program 108 and the PLC parameter 107 by connecting a programming tool and a configuration tool to the external device connection circuit and operating these tools. The programming tool and the configuration tool are realized, for example, by executing a predetermined program on a personal computer.

The bus I/F 106 is an interface for connecting to the system bus 81. The CPU unit 1 transfers data between the motion controller unit 2, the C language controller unit 3, the intelligent unit 5, and the I/O unit 6 and sends the collected data to the HMI display terminal unit 4 via the bus I/F 106.

The configuration example of the PLC 1000 illustrated in FIG. 1 is an example, and some units can be omitted or other desired units can be added. Although the configuration example of the CPU unit 1 has been explained as an example of the control device, each of the motion controller unit 2 and the C language controller unit 3 also includes a data memory from which data can be collected in a similar manner to the CPU unit 1.

The server 13 is typically configured from a processor, a large-capacity memory, and a network interface and can store various types of data in the memory. The HMI display data 11 is stored in the memory. The database 12 is constructed by using the memory. The processor controls the operation of the server 13 in accordance with a program stored in advance.

Figure 4:
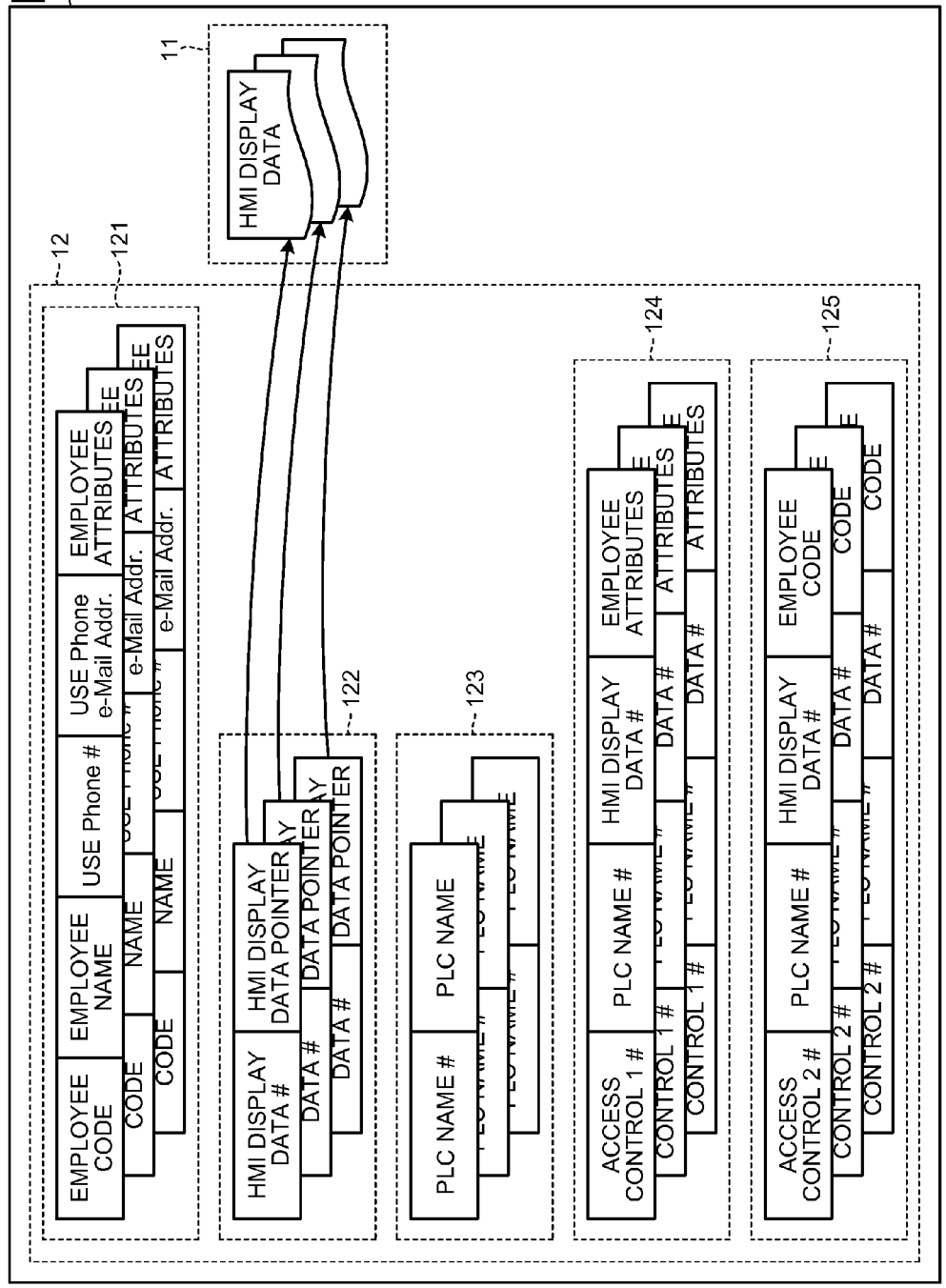
FIG. 4 is a diagram illustrating a configuration example of a database constructed in a server.

FIG. 4 is a diagram illustrating a configuration example of the database 12 constructed in the server 13. As illustrated in FIG. 4, the database 12 includes an employee management table 121, an HMI data management table 122, a PLC name management table 123, a first access control table 124, and a second access control table 125.

In the employee management table 121, an entry including the employee code, the employee name, the phone number (Phone #) of the smartphone 91 used by the employee, the e-Mail address (Phone-MailAddr.) of the smartphone 91 used by the employee, and the employee attributes indicating the hierarchy of the employee or the job grade the employee is in charge of are registered for each employee.

In the HMI data management table 122, the association of the unique identification number (HMI display data #) for each HMI display data 11 and the HMI display data pointer indicating the location at which the HMI display data 11 specified by the identification number is stored is registered for each HMI display data 11.

In the PLC name management table 123, the association of the unique identification number (PLC name #) for each PLC name 110 and the PLC name 110 specified by the identification number is registered.

The first access control table 124 is a table that is used for determining the HMI display data 11 to be transmitted to the smartphone 91 in accordance with the employee attributes of the owner of the smartphone 91. The second access control table 125 is a table that is used for determining the HMI display data 11 to be transmitted to the smartphone 91 in accordance with the employee code of the owner of the smartphone 91.

Specifically, in the first access control table 124, entries including the access control number (#), the PLC name #, the HMI display data #, and the employee attributes are registered. Each entry registered in the first access control table 124 indicates the employee attributes of the owner of the smartphone 91 that is allowed as a target to which the HMI display data 11 specified by the HMI display data # is to be transmitted.

In the second access control table 125, entries including the access control number (#), the PLC name #, the HMI display data #, and the employee code are registered. Each entry registered in the second access control table 125 indicates the employee code of the owner of the smartphone 91 that is allowed as a target to which the HMI display data 11 specified by the HMI display data # is to be transmitted.

Figure 5:
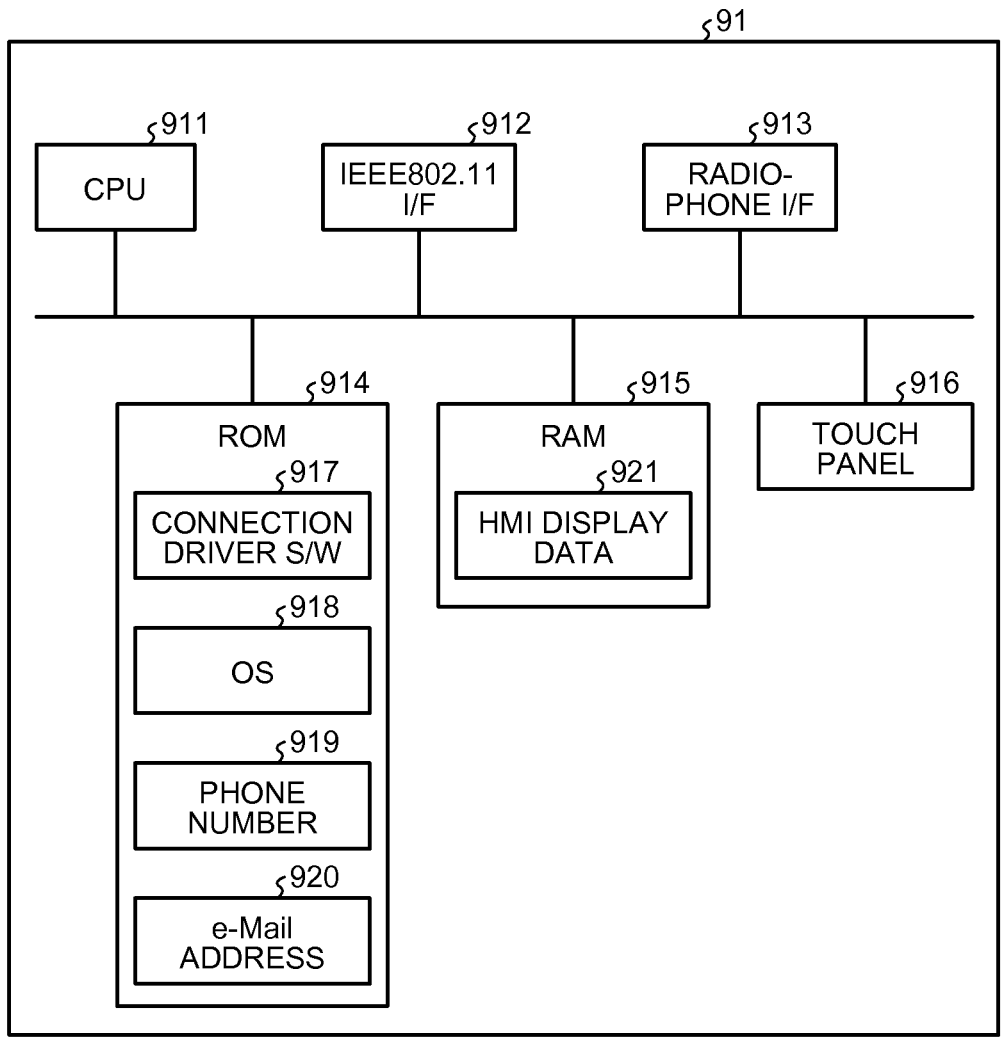
FIG. 5 is a diagram illustrating a hardware configuration example of a smartphone.

FIG. 5 is a diagram illustrating a hardware configuration example of the smartphone 91. As illustrated in FIG. 5, the smartphone 91 includes a CPU 911, an IEEE802.11 I/F 912, a radiophone I/F 913, a ROM 914, a RAM 915, and a touch panel 916 that is a display. The CPU 911, the IEEE802.11 I/F 912, the radiophone I/F 913, the ROM 914, the RAM 915, and the touch panel 916 are connected to each other via an internal bus.

The ROM 914 stores in advance an OS 918 for controlling the smartphone 91, a phone number 919, and an e-mail address 920. The phone number 919 and the e-mail address 920 are information unique to each smartphone 91. In the present embodiment, these pieces of information are used as a search key for specifying the employee code or the employee attributes of the operator who owns the smartphone 91.

The ROM 914 stores therein a connection driver software (S/W) 917 that is a program for performing communication by connecting to the HMI display terminal unit 4. In this embodiment, the provider of the HMI display terminal unit 4 uploads in advance the connection driver S/W 917 to a predetermined download site on the Internet. The operator can download the connection driver S/W 917 to the smartphone 91 from the download site described above and can store (install) the connection driver S/W 917 in the ROM 914.

The CPU 911 executes the connection driver S/W 917 under the control of the OS 918 stored in the ROM 914.

The RAM 915 temporarily stores therein the HMI display data 11 sent from the HMI display terminal unit 4. The HMI display data 11 stored in the RAM 915 is represented as HMI display data 921. The CPU 911 displays the collected data sent from the HMI display terminal unit 4 on the touch panel 916 by using the HMI display data 921 stored in the RAM 915.

The IEEE802.11 I/F 912 is a wireless communication interface for wirelessly connecting to the HMI display terminal unit 4, and the radiophone I/F 913 is a wireless communication interface for performing telephone communication using the smartphone 91.

Next, an explanation will be given of the process performed by using the HMI system according to the embodiment of the present invention.

Figure 6:
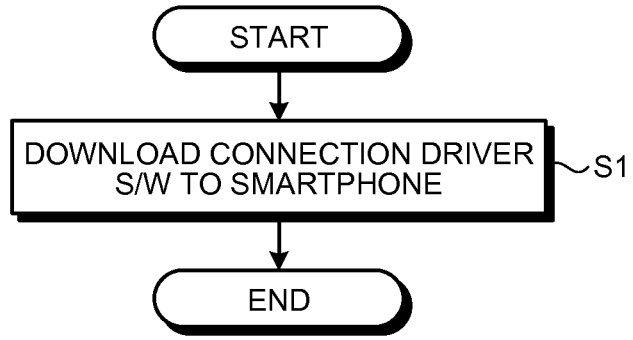
FIG. 6 is a flowchart explaining a preparation process performed by an operator who owns a smartphone.

FIG. 6 is a flowchart explaining a preparation process performed by the operator who owns the smartphone 91. As illustrated in FIG. 6, the operator downloads the connection driver S/W 917 to the smartphone 91 by operating the smartphone 91 (Step S1). The downloaded connection driver S/W 917 is stored in the ROM 914. The preparation process performed by the operator is finished by performing the process at Step S1.

FIG. 7 is a sequence diagram explaining the operations of the HMI display terminal unit 4 and the CPU unit 1 performed when the PLC 1000 is turned on. The operation of the HMI display terminal unit 4 explained in FIG. 7 is realized by the CPU 41 executing the OS 431, and the operation of the CPU unit 1 is realized by the CPU 101 executing the OS 109. As illustrated in FIG. 7, when the PLC 1000 is turned on and the power generated by the power supply unit 7 is supplied via the base unit 8, the HMI display terminal unit 4 requests the CPU unit 1 to read the PLC name (Step S11). When the CPU unit 1 receives a request for reading of the PLC name (Step S12), the CPU unit 1 reads the PLC name 110 from the ROM 103 or the RAM 104 and returns the read PLC name 110 to the HMI display terminal unit 4 (Step S13). The HMI display terminal unit 4 acquires the PLC name 110 transmitted from the CPU unit 1 (Step S14) and ends the operation performed when the power is turned on. The HMI display terminal unit 4 acquires the PLC name 110 that is identification information for specifying the CPU unit 1 and therefore can search the database 12 for the HMI display data 11 for displaying the collected data concerning the CPU unit 1.

FIG. 8 is a sequence diagram explaining the operations of the HMI display terminal unit 4 and the connection driver S/W 917 executed in the smartphone 91 when the HMI display terminal unit 4 and the smartphone 91 start to connect with each other. The operation of the HMI display terminal unit 4 explained in FIG. 8 is realized by the CPU 41 executing the OS 431. As illustrated in FIG. 8, the HMI display terminal unit 4 determines whether the motion sensor 45 has detected the approach of a person (operator) (Step S21). When the motion sensor 45 detects the location of a person, the HMI display terminal unit 4 can determine that the approach of a person has been detected. When the motion sensor 45 does not detect the location of a person, the HMI display terminal unit 4 can determine that the approach of a person has not been detected. When the motion sensor 45 has not detected the approach of a person (No at Step S21), the HMI display terminal unit 4 performs the determination process at Step S21 again. When the motion sensor 45 has detected the approach of a person (Yes at Step S21), the HMI display terminal unit 4 connects itself to the connection driver S/W 917 by using the IEEE802.11 I/F 46 (Step S22).

The HMI display terminal unit 4 can be configured to have an access point function and a DHCP server function using the IEEE802.11 I/F 46 and the smartphone 91 can be configured to have a DHCP client function. The HMI display terminal unit 4 may assign an IP address to the smartphone 91 by using a DHCP server function and thereafter establish a connection between the HMI display terminal unit 4 and the smartphone 91 by using the IP address assigned to the smartphone 91 as a connection destination and then perform the process at Step S22.

Although not illustrated, when the smartphone 91 in which the connection driver S/W 917 is installed is not within the radio coverage area of the IEEE802.11 I/F 46, there is no communication partner for the HMI display terminal unit 4; therefore, the process at Step S22 fails and it is possible for the HMI display terminal unit 4 to perform the determination process at Step S21 again.

After the process at Step S22 is completed, the connection driver S/W 917 reads the e-Mail address 920 and the phone number 919 from the ROM 914 (Step S23) and responds to the HMI display terminal unit 4 with the read e-Mail address 920 and phone number 919 as an operator ID (Step S24).

The HMI display terminal unit 4 acquires the operator ID from the content of the response from the connection driver S/W 917 (Step S25). Then, the operation performed when the HMI display terminal unit 4 and the smartphone 91 start to connect with each other is finished.

As described above, the procedure when the HMI display terminal unit 4 and the smartphone 91 start to connect with each other does not require a login process in which a login ID is used. If a login process is used, personation using a login ID may occur. In this embodiment, in order to specify the owner of the smartphone 91, the e-Mail address 920 and the phone number 919 are used as identification information (unique information) that is unique to the smartphone 91; therefore, it becomes difficult to commit personation using the smartphone 91. Each of the e-Mail address 920 and the phone number 919 can independently be identification information of the smartphone 91. Therefore, at Step S24, the connection driver S/W 917 may respond to the HMI display terminal unit 4 with any one of the e-Mail address 920 and the phone number 919 as the operator ID. When the operator has the tablet PC 92 having no phone function as the personal digital assistant 9, only the e-Mail address 920 may be used as the unique information on the tablet PC 92, i.e., the operator ID. It is possible to use information uniquely assigned to each personal digital assistant 9, such as a serial number of the personal digital assistant 9, as unique information on the personal digital assistant 9. In such a case, it is satisfactory that the employee management table 121 is configured such that the fields of the use phone# and the use Phone e-Mail-Addr. are changed in accordance with the information to be used.

FIG. 9 is a flowchart explaining the operation of the HMI display terminal unit 4 after connecting to the smartphone 91. As illustrated in FIG. 9, the HMI display terminal unit 4 searches the database 12 for the already acquired operator ID and PLC name 110, which are search keys (Step S31).

The process at Step S31 is performed, for example, in the following manner. Specifically, the HMI display terminal unit 4 first searches the employee management table 121 for the operator ID to acquire the employee attributes. Moreover, the HMI display terminal unit 4 searches the PLC name management table 123 for the PLC name 110 to acquire the PLC name number. Then, the HMI display terminal unit 4 searches the first access control table 124 for the combination of the employee attributes and the PLC name number, which is a search key, to acquire the HMI display data number. Then, the HMI display terminal unit 4 searches the HMI data management table 122 for the acquired HMI display data number to acquire the HMI display data pointer. If the HMI display terminal unit 4 fails in any one of these search processes, the HMI display terminal unit 4 cannot acquire the HMI display data pointer. For example, if a corresponding entry is not present in the first access control table 124, it is determined that the search fails. When access control is performed by using the employee code, it is satisfactory that the HMI display terminal unit 4 acquires the employee code by using the operator ID and searches the second access control table 125 for the acquired employee code.

The process at Step S31 substantially corresponds to the process of authenticating the smartphone 91. Specifically, as described above, the database 12 has a structure from which the HMI display data 11 (more accurately, HMI display data pointer) that is allowed to be displayed on the smartphone 91 can be acquired by using the operator ID for which unique information on the smartphone 91 is used. Accordingly, success in the search at Step S31 is equivalent to the smartphone 91 being approved as a target on which the collected data of the control device specified by the PLC name 110 via the HMI display terminal unit 4 is to be displayed and failure in the search at Step S31 is equivalent to the smartphone 91 being not approved.

After Step S31, it is determined whether the HMI display data 11 corresponding to the HMI display data 11 that can be transmitted to the smartphone 91 is present (Step S32). When the search at Step S31 is successful and the HMI display data pointer can be acquired, it is determined that the corresponding HMI display data 11 is present. When the search at Step S31 fails, it is determined that the corresponding HMI display data 11 is not present. When the corresponding HMI display data 11 is not present (No at Step S32), the HMI display terminal unit 4 generates a message indicating the absence of the corresponding HMI display data (Step S33) and transmits the generated message to the smartphone 91 (Step S34). The message received by the smartphone 91 is displayed on the touch panel 916 by the connection driver S/W 917.

After the process at Step S34, the HMI display terminal unit 4 severs the connection with the connection driver S/W 917 (Step S35) and ends the operation.

When the corresponding HMI display data 11 is present (Yes at Step S32), the HMI display terminal unit 4 acquires the HMI display data 11 stored at the address indicated by the HMI display data pointer acquired by the search process at Step S31 from among one or more pieces of the HMI display data 11 stored in the server 13 (Step S36) and transmits the acquired HMI display data 11 to the smartphone 91 (Step S37). The acquired HMI display data 11 is temporarily stored as the HMI display data 442 in the RAM 44 of the HMI display terminal unit 4. The HMI display data 11 transmitted to the smartphone 91 is stored as the HMI display data 921 in the RAM 915.

Next, the HMI display terminal unit 4 collects data stored in the data memory from the control device defined by the HMI display data 442 (Step S38). The collected data is temporarily stored as the PLC data 441 in the RAM 44. The time interval for specifying data to be collected and for collecting data is defined by the HMI display data 442. Then, the HMI display terminal unit 4 transmits the collected PLC data 441 to the smartphone 91 (Step S39). In the smartphone 91, the connection driver S/W 917 shapes the transmitted PLC data 441 in accordance with the HMI display data 921 stored in the RAM 915 and displays it on the touch panel 916.

Next, the HMI display terminal unit 4 determines whether the motion sensor 45 detects a person (Step S40). The determination process at Step S40 is similar to the determination process at Step S21. When the motion sensor 45 does not detect a person (No at Step S40), this indicates that the operator who owns the smartphone 91 that had been receiving the collected data from the HMI display terminal unit 4 up to that point has moved out of the detection range of the motion sensor 45 from the vicinity of the HMI display terminal unit 4; therefore, the HMI display terminal unit 4 performs the process at Step S35.

When the motion sensor 45 detects a person (Yes at Step S40), the HMI display terminal unit 4 connects itself to the connection driver S/W 917 by using the IEEE802.11 I/F 46 just to make sure (Step S41) and acquires the operator ID again (Step S42). Then, the HMI display terminal unit 4 searches the database 12 for the operator ID acquired at Step S42 and the PLC name 110, which are search keys (Step S43). The process at Step S43 is similar to the process at Step S31.

Next, the HMI display terminal unit 4 determines whether the operator who has the operator ID acquired in the process at Step S42 is allowed to connect to the PLC 1000 on the basis of the result of the search process at Step S43 (Step S44). When the HMI display terminal unit 4 fails in the search process at Step S43, the HMI display terminal unit 4 determines that the operator is not allowed to connect to the PLC 1000. When the HMI display terminal unit 4 can acquire the HMI display data pointer through the search process at Step S43, the HMI display terminal unit 4 determines that the operator is allowed to connect to the PLC 1000.

When the operator who has the operator ID acquired in the process at Step S42 is not allowed to connect to the PLC 1000 (No at Step S44), the HMI display terminal unit 4 performs the process at Step S35 to sever the connection with the smartphone 91 that includes the operator ID for which it is determined that connection to the PLC 1000 is not allowed.

When the operator who has the operator ID acquired in the process at Step S42 is allowed to connect to the PLC 1000 (Yes at Step S44), the HMI display terminal unit 4 performs the process at Step S38 again.

For example, for an operator A, who is an operator within the detection range of the motion sensor 45 and the coverage area of the wireless communication by the IEEE802.11 I/F 46 and for whom Yes is determined in the determination process at Step S32, Yes is also determined in the determination process at Step S44; therefore, the collected data continues to be displayed on the smartphone 91 (Step S38 and Step S39).

In contrast, for an operator B, who was not in the detection range of the motion sensor 45 and newly enters the coverage area of the wireless communication by the IEEE802.11 I/F 46 and who is not authorized to access any control device included in the PLC 1000, No is determined in the determination process at Step S44 and the smartphone 91 owned by the operator B and the HMI display terminal unit 4 are disconnected (Step S35).

The HMI display terminal unit 4 determines whether the collected data can continue to be displayed by searching the database 12 using the operator ID reacquired in the processes at Step S41 to Step S42; however, the HMI display terminal unit 4 may store the operator ID with respect to which the processes at Step S38 and Step S39 are to be performed and make a determination depending on whether the operator ID reacquired in the processes at Step S41 to Step S42 matches the stored operator ID. In such a case, it is satisfactory that the HMI display terminal unit 4 erases the stored operator ID when the process at Step S35 is performed after No is determined at Step S40.

Moreover, when Step S37 is performed, the HMI display terminal unit 4 may record the combination of the operator ID of the smartphone 91 that is a transmission destination of the HMI display data 11, the PLC name 110, the HMI display data number (or the HMI display data pointer) of the transmitted HMI display data 11, and the time at which Step S37 is performed in the HMI display terminal unit 4 or the server 13, and search the record for the operator ID as a search key that is reacquired in the processes at Step S41 to Step S42, thereby determining whether the collected data can continue to be displayed. In such a case, it is satisfactory that when the process at Step S35 is performed after the determination No at Step S40, the HMI display terminal unit 4 erases the corresponding entry in the record content or continues to maintain the entry by setting a disconnection flag on the corresponding entry or by recording the disconnection time. If the HMI display terminal unit 4 stores the above record in the server 13 and sets a disconnection flag on the corresponding record or records the disconnection time at the time of disconnection, the administrator of the HMI system can recognize which control device was accessed by whom and when by checking the record stored in the server 13.

When the HMI display terminal unit 4 performs Step S37, the HMI display terminal unit 4 may accumulate and store the associations of the operator ID and the HMI display data 11 in the server 13. By accumulating and storing the associations, the user can trace which operator uses which HMI display data 11 to acquire collected data.

Moreover, when the HMI display terminal unit 4 performs Step S37, the HMI display terminal unit 4 may accumulate and store the associations of the operator ID and the PLC name 110 in the server 13. By accumulating and storing the associations, the user can trace which operator has acquired internal information on which control device.

Figure 10:
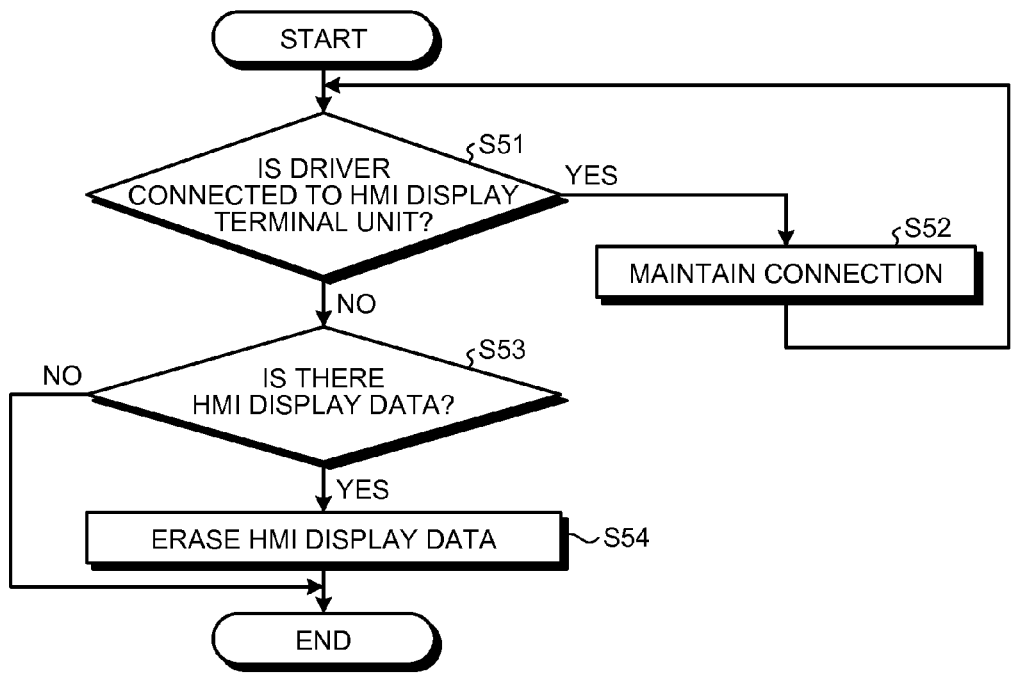
FIG. 10 is a flowchart explaining the operation of the connection driver S/W.

FIG. 10 is a flowchart explaining the operation of the connection driver S/W 917 executed in the smartphone 91. As illustrated in FIG. 10, the connection driver S/W 917 determines whether the connection driver S/W 917 is connected to the HMI display terminal unit 4 (Step S51). If the connection driver S/W 917 is connected to the HMI display terminal unit 4 (Yes at Step S51), the connection driver S/W 917 maintains the connection (Step S52) and performs the determination process at Step S51 again.

If the connection driver S/W 917 is not connected to the HMI display terminal unit 4 (No at Step S51), the connection driver S/W 917 determines whether the HMI display data 921 is stored in the RAM 915 (Step S53). If the HMI display data 921 is stored in the RAM 915 (Yes at Step S53), the connection driver S/W 917 erases the HMI display data 921 (Step S54) and ends the operation. If the HMI display data 921 is not stored in the RAM 915 (No at Step S53), the process at Step S54 is skipped.

Even while the connection driver S/W 917 is connected to the HMI display terminal unit 4, if the collected data has not been received for a certain period of time, the connection driver S/W 917 may perform the process at Step S54. Accordingly, it becomes possible to reduce the risk of leakage of the HMI display data 921.

The access control tables 124 and 125 are tables that indicate employees or employee attributes that are allowed as a target to which the HMI display data 11 is to be transmitted, and it is possible to additionally store, in the database 12, a third access control table that indicates employees or employee attributes that are not allowed as a target to which the HMI display data 11 is to be transmitted. In such a case, when the HMI display terminal unit 4 can acquire an entry from the third access control table by the search at Step S31 or Step S43, for example, it is possible to realize exclusive control for preventing collected data from being provided to an operator who is not allowed to access the control devices by recognizing that the search has failed regardless of whether the entry can be acquired from the access control tables 124 and 125.

In the above description, an explanation is made such that the HMI display terminal unit 4, which is the display information collecting device, is configured to be connected to the base unit 8 of the PLC 1000; however, the connection configuration between the HMI display terminal unit 4 and the CPU unit 1, the motion controller unit 2, and the C language controller unit 3, which are control devices, is not limited to the connection configuration via the base unit 8. The control device to which the display information collecting device in the embodiment of the present invention is connected and from which internal information is to be collected is not limited to the control devices from which the PLC 1000 is configured. For example, a microcomputer control device can be a connection destination of the display information collecting device in the embodiment of the present invention. The connection between the control device and the display information collecting device can be realized by wire, wireless, or both.

As described above, according to the embodiment of the present invention, the configuration is such that the HMI display terminal unit 4 includes the motion sensor 45 that detects the location of the operator in the vicinity of the HMI display terminal unit 4; the IEEE802.11 I/F 46 that is a wireless communication interface for performing wireless communication with the smartphone 91 that includes the touch panel 916, which is a display, and stores the phone number 919 and the e-mail address 920 as unique information; and the CPU 41 that transmits, to the smartphone 91 via the IEEE802.11 I/F 46, data collected from the control device and the HMI display data 11 that shapes the collected data for display, wherein the CPU 41 determines whether the operator has approached the vicinity of the HMI display terminal unit 4 on the basis of the detection result of the motion sensor 45; when an operator has approached the vicinity of the HMI display terminal unit 4, acquires unique information on the smartphone 91 owned by the operator who has approached the vicinity of the HMI display terminal unit 4 via the IEEE802.11 I/F 46 and authenticates the smartphone 91 on the basis of the acquired unique information; when authentication is successful, transmits the HMI display data 11 and the collected data; and, when authentication fails, does not transmit the HMI display data 11 and the collected data. Therefore, the HMI display terminal unit 4 can cause the display of the personal digital assistant owned by the operator to display the collected data. Accordingly, it is possible to realize the HMI function of the control device by using a personal digital assistant.

Accordingly, the HMI display terminal unit 4 can be configured without a touch panel; therefore, the HMI display terminal unit 4 can be reduced in size. As a result, it is possible to prevent an increase in size of the control panel more than necessary. Moreover, because the HMI display terminal unit 4 does not include a touch panel, the power consumption of the PLC 1000 can be reduced. Furthermore, the price of the HMI display terminal unit 4 can be determined without depending on the market price of liquid crystal panels, which are components of touch panels.

Moreover, the configuration is such that the CPU 41 performs authentication by searching the database 12, in which unique information on the smartphone 91 that is allowed to connect to the control device is registered in advance, for the unique information that is a search key. Therefore, it is possible to prevent leakage of the HMI display data 11 to outsiders.

Moreover, the configuration is such that a plurality of pieces of the HMI display data 11 are prepared in advance, in the database 12, an association of unique information and the HMI display data 11 that is allowed to be displayed on the smartphone 91 that stores the unique information among the plurality of pieces of the HMI display data 11 is registered, and the CPU 41 determines whether the entry that includes the acquired unique information is registered in the database 12; recognizes that authentication fails when the corresponding entry is not present; and recognizes that authentication is successful and sets the HMI display data 11 associated with the acquired unique information in the entry as the HMI display data 11 to be transmitted when the corresponding entry is present. Accordingly, it is possible to switch between a plurality of pieces of the HMI display data 11 depending on the operator and transmit the HMI display data 11.

Moreover, the configuration is such that after the CPU 41 recognizes the operator who has approached the vicinity of the HMI display terminal unit 4 on the basis of the detection result of the motion sensor 45, the CPU 41 starts to connect with the smartphone 91 owned by the operator via the IEEE802.11 I/F 46 to perform authentication using unique information, and after the CPU 41 transmits the collected data, the CPU 41 determines whether the motion sensor 45 detects or does not detect the location of the operator; continues to transmit the collected data when the motion sensor 45 detects the location of the operator; and severs the connection with the connected smartphone 91 when the motion sensor 45 does not detect the location of the operator. Accordingly, the HMI display terminal unit 4 provides the collected data to the operator present in the vicinity of the HMI display terminal unit 4, and, when the operator moves away from the vicinity of the HMI display terminal unit 4, the HMI display terminal unit 4 automatically stops the provision of the collected data.

Moreover, the configuration is such that the database 12 is stored in the server 13, which is connected to the HMI display terminal unit 4 via the network. Accordingly, the user can perform centralized control of the information for authenticating the HMI display data 11.

Moreover, the configuration is such that the smartphone 91 stores the HMI display data 11 transmitted from the HMI display terminal unit 4 in the RAM 915 that is an internal memory, shapes the collected data transmitted from the HMI display terminal unit 4 by using the HMI display data 921 stored in the RAM 915, and displays the collected data on the touch panel 916, and after the connection with the HMI display terminal unit 4 is severed, the smartphone 91 erases the HMI display data 921 stored in the RAM 915. Accordingly, it becomes possible to reduce the risk of leakage of the HMI display data 921.

INDUSTRIAL APPLICABILITY

As described above, the display information collecting device and the HMI system according to the present invention are preferably applied to a display information collecting device and an HMI system that realize the HMI function of a control device that controls a controlled device.

REFERENCE SIGNS LIST

1 CPU unit
2 motion controller unit
3 C language controller unit
4 HMI display terminal unit
5 intelligent unit 6 I/O unit
7 power supply unit
8 base unit
9 personal digital assistant
11 HMI display data
12 database
13 server
41, 101, 911 CPU
42, 106 bus I/F
43, 103, 914 ROM
44, 104, 915 RAM
45 motion sensor
46 IEEE802.11 I/F
81 system bus
91 smartphone
92 tablet PC
102 external device connection circuit
105 device memory
107 PLC parameter
108 sequence ladder program
109, 431, 918 OS
110 PLC name
121 employee management table
122 HMI data management table
123 PLC name management table
124 first access control table
125 second access control table
441 PLC data
442 HMI display data
916 touch panel
917 connection driver S/W
919 phone number
920 e-mail address
921 HMI display data
913 radiophone I/F
1000 PLC

The invention claimed is:

1. A display information collecting device that is connected to a control device and collects internal information in the control device for display, the device comprising:
    a motion sensor that detects a location of an operator who is located within a first range in a vicinity of the display information collecting device;
    a wireless communication interface that is a wireless communication interface for performing wireless communication with a personal digital assistant that includes a display and stores unique information and whose communicable radio coverage area is a second range that is larger than the first range in a vicinity of the display information collecting device; and
    a control unit that transmits, to the personal digital assistant via the wireless communication interface, the collected internal information and screen data that shapes the collected internal information for display, in order to cause the display of the personal digital assistant to display the collected internal information, wherein
    the control unit, when the motion sensor detects a location of an operator, acquires unique information from all personal digital assistants within the second range including a personal digital assistant owned by the operator via the wireless communication interface and authenticates each of the personal digital assistants on a basis of the acquired unique information; when authentication is successful, transmits the screen data and the collected internal information to a first personal digital assistant for which the authentication is successful; and, when authentication fails, disconnects communication with a personal digital assistant for which the authentication fails without transmitting the screen data and the collected internal information to the personal digital assistant for which the authentication fails, and
    after the control unit starts to transmit the collected internal information to the first personal digital assistant, the control unit repeatedly performs detection of an operator within the first range and, when an operator is detected within the first range, acquisition of unique information from all personal digital assistants within the second range and authentication based on the acquired unique information; when the motion sensor does not detect a location of an operator, disconnects communication with all personal digital assistants within the second range including the first personal digital assistant; when authentication of the first personal digital assistant is successful, continues to transmit the collected internal information to the first personal digital assistant; when authentication of a second personal digital assistant, which is different from the first personal digital assistant, is newly successful, transmits the screen data and the collected internal information to the second personal digital assistant; and, when authentication fails, disconnects communication with a personal digital assistant for which the authentication fails.

2. The display information collecting device according to claim 1, wherein the control unit performs authentication by searching a database in which unique information on a personal digital assistant that is allowed to connect to a control device is registered in advance for the acquired unique information that is a search key.

3. The display information collecting device according to claim 2, wherein
    a plurality of pieces of the screen data are prepared in advance,
    in the database, an association of unique information and screen data that is allowed to be displayed on a personal digital assistant that stores the unique information among the plurality of pieces of the screen data is registered, and
    the control unit determines presence or absence of an entry that includes the acquired unique information; recognizes that authentication fails when a corresponding entry is not present; and recognizes that authentication is successful and sets screen data associated with the acquired unique information in the entry as screen data to be transmitted when a corresponding entry is present.

4. An HMI system comprising:
    one or more personal digital assistants that include a display and each store unique information; and
    a display information collecting device that is connected to a control device and collects internal information in the control device for display, wherein
    the display information collecting device includes
        a motion sensor that detects a location of an operator who is located within a first range in a vicinity of the display information collecting device,
        a wireless communication interface whose communicable radio coverage area is a second range that is larger than the first range in a vicinity of the display information collecting device and that is for performing wireless communication with the one or more personal digital assistants, and
        a control unit that transmits, to the personal digital assistant via the wireless communication interface, the collected internal information and screen data that shapes the collected internal information for display, in order to cause the display of the personal digital assistant to display the collected internal information, the control unit, when the motion sensor detects a location of an operator, acquires unique information from all personal digital assistants within the second range including a personal digital assistant owned by the operator via the wireless communication interface and authenticates each of the personal digital assistants on a basis of the acquired unique information; when authentication is successful, transmits the screen data and the collected internal information to a first personal digital assistant for which the authentication is successful; and, when authentication fails, disconnects communication with a personal digital assistant for which the authentication fails without transmitting the screen data and the collected internal information to the personal digital assistant for which the authentication fails, and after the control unit starts to transmit the collected internal information to the first personal digital assistant, the control unit repeatedly performs detection of an operator within the first range and, when an operator is detected within the first range, acquisition of unique information from all personal digital assistants within the second range and authentication based on the acquired unique information; when the motion sensor does not detect a location of an operator, disconnects communication with all personal digital assistants within the second range including the first personal digital assistant; when authentication of the first personal digital assistant is successful, continues to transmit the collected internal information to the first personal digital assistant; when authentication of a second personal digital assistant, which is different from the first personal digital assistant, is newly successful, transmits the screen data and the collected internal information to the second personal digital assistant; and, when authentication fails, disconnects communication with a personal digital assistant for which the authentication fails.

5. The HMI system according to claim 4, further comprising a database in which unique information on a personal digital assistant that is allowed to connect to a control device is registered in advance, wherein
the control device performs authentication by searching the database for the acquired unique information that is a search key.

6. The HMI system according to claim 5, wherein
a plurality of pieces of the screen data are prepared in advance,
in the database, an association of unique information and screen data that is allowed to be displayed on a personal digital assistant that stores the unique information among the plurality of pieces of the screen data is registered, and
the control unit determines presence or absence of an entry that includes the acquired unique information; recognizes that authentication fails when a corresponding entry is not present; and recognizes that authentication is successful and sets screen data associated with the acquired unique information in the entry as screen data to be transmitted when a corresponding entry is present.

7. The HMI system according to claim 5, wherein the database is stored in a first server that is connected to the display information collecting device via a network.

8. The HMI system according to claim 6, wherein
the plurality of pieces of screen data are stored in advance in a second server that is connected to the display information collecting device via a network, and
each entry of the database includes a storage position of screen data that is allowed to be displayed.

9. The HMI system according to claim 4, wherein
the personal digital assistant stores screen data transmitted from the display information collecting device in an internal memory, shapes collected data transmitted from the display information collecting device by using screen data stored in the internal memory, and displays the collected data on the display, and
after a connection with the display information collecting device is severed, the personal digital assistant erases the screen data stored in the internal memory.

10. The HMI system according to claim 4, wherein the control unit registers an association of unique information on a personal digital assistant that is a transmission destination of the screen data and screen data transmitted to the personal digital assistant in a second database.

11. The HMI system according to claim 10, further comprising a third server that is connected to the display information collecting device via a network, wherein
the second database is stored in the third server.

12. The HMI system according to claim 4, wherein the control unit registers an association of unique information on a personal digital assistant that is a transmission destination of the screen data and identification information on a control device corresponding to the screen data in a second database.

13. The HMI system according to claim 12, further comprising a third server that is connected to the display information collecting device via a network, wherein
the second database is stored in the third server.

14. An HMI system comprising:
a personal digital assistant that includes a display and stores unique information; and a display information collecting device that includes a wireless communication interface, is connected to a control device, collects internal information in the control device, and transmits, to the personal digital assistant via the wireless communication interface, the collected internal information and screen data that shapes the collected internal information for display, in order to cause the display of the personal digital assistant to display the collected internal information, wherein
the display information collecting device includes a motion sensor that detects a location of an operator in a vicinity of the display information collecting device, and
a control unit that determines whether an operator has approached a vicinity of the display information collecting device on a basis of a detection result of the motion sensor; when an operator has approached a vicinity of the display information collecting device, acquires unique information on a personal digital assistant owned by the operator who has approached a vicinity of the display information collecting device via the wireless communication interface and authenticates the personal digital assistant on a basis of the acquired unique information; when authentication is successful, transmits the screen data and the collected internal information; and, when authentication fails, does not transmit the screen data and the collected internal information, and
when the control unit transmits the screen data to a personal digital assistant for which the authentication is successful, the control unit registers an association of unique information on a personal digital assistant that is a transmission destination of the screen data and screen data transmitted to the personal digital assistant in a database;
the control unit, when the motion sensor detects a location of an operator, acquires unique information from all personal digital assistants within a second range including a personal digital assistant owned by the operator via the wireless communication interface and authenticates each of the personal digital assistants on a basis of the acquired unique information; when authentication is successful, transmits the screen data and the collected internal information to a first personal digital assistant for which the authentication is successful; and, when authentication fails, disconnects communication with a personal digital assistant for which the authentication fails without transmitting the screen data and the collected internal information to the personal digital assistant for which the authentication fails, and after the control unit starts to transmit the collected internal information to the first personal digital assistant, the control unit repeatedly performs detection of an operator within the first range and, when an operator is detected within the first range, acquisition of unique information from all personal digital assistants within the second range and authentication based on the acquired unique information; when the motion sensor does not detect a location of an operator, disconnects communication with all personal digital assistants within the second range including the first personal digital assistant; when authentication of the first personal digital assistant is successful, continues to transmit the collected internal information to the first personal digital assistant; when authentication of a second personal digital assistant, which is different from the first personal digital assistant, is newly successful, transmits the screen data and the collected internal information to the second personal digital assistant; and, when authentication fails, disconnects communication with a personal digital assistant for which the authentication fails.

15. The HMI system according to claim 14, further comprising a server that is connected to the display information collecting device via a network, wherein the database is stored in the server.

\* \* \* \* \*